(12) United States Patent
Kilcher et al.

(10) Patent No.: US 9,846,353 B2
(45) Date of Patent: Dec. 19, 2017

(54) PROJECTION DEVICE COMBINING AND MODIFING LIGHT BEAM CROSS SECTIONAL DIMENSIONS

(75) Inventors: Lucio Kilcher, Montreux (CH); Nicolas Abele, Demoret (CH)

(73) Assignee: INTEL CORPORATION, Santa Clara, CA (US)

( * ) Notice: Subject to any disclaimer, the term of this patent is extended or adjusted under 35 U.S.C. 154(b) by 11 days.

(21) Appl. No.: 14/403,818

(22) PCT Filed: Jun. 1, 2012

(86) PCT No.: PCT/EP2012/060340
§ 371 (c)(1),
(2), (4) Date: Nov. 25, 2014

(87) PCT Pub. No.: WO2013/178280
PCT Pub. Date: Dec. 5, 2013

(65) Prior Publication Data
US 2015/0286121 A1 Oct. 8, 2015

(51) Int. Cl.
*G03B 21/14* (2006.01)
*G03B 21/20* (2006.01)
(Continued)

(52) U.S. Cl.
CPC ....... *G03B 21/208* (2013.01); *G02B 26/0833* (2013.01); *G02B 27/104* (2013.01);
(Continued)

(58) Field of Classification Search
CPC .............. G02B 26/0833; G02B 27/104; G03B 21/145; G03B 21/147; G03B 21/2066;
(Continued)

(56) References Cited

U.S. PATENT DOCUMENTS

| 5,731,577 A | 3/1998 | Tanitsu |
| 2006/0262371 A1 | 11/2006 | Tan et al. |

(Continued)

FOREIGN PATENT DOCUMENTS

| JP | 2003-248184 | 9/2003 |
| JP | 2004-070312 | 3/2004 |

(Continued)

OTHER PUBLICATIONS

Office Action received for Japanese Patent Application No. 2015-514364, dated Dec. 15, 2015, 6 pages including 3 pages English translation.

*Primary Examiner* — Sultan Chowdhury
*Assistant Examiner* — Magda Cruz

(57) ABSTRACT

A projection device comprising, a red light source, a green light source, and a blue light source which can emit red, green and blue light respectively, a beam combiner which is configured such that it can combine light beams; a means for collimating the light emitted from the red, green and blue light sources to provide red, green and blue collimated light beams, an optical modifier means, which is arranged such that the optical modifier means can receive the red, green and blue collimated light beams, and wherein the optical modifier means is configured to modify cross sectional dimensions of the red, green and blue collimated light beams to provide red, green and blue projection beams each of which has a circular cross section, and wherein the optical modifier means is configured, and the distances between the light sources and means for collimating are set, such that the dimensions of the circular cross sections of the red, green and blue projection beams are equal at a predetermined distance from the projection device such that the spot sizes of each of the red, green and blue projection beams are equal or have predefined sport sizes at the predetermined distance from the projection device; MEMS mirror which is config- (Continued)

ured such that it can oscillate about at least one oscillation axis to scan the red, green and blue projection beams across a projection screen which is positioned at the predetermined distance from the projection device.

20 Claims, 10 Drawing Sheets

(51) Int. Cl.
G02B 26/08 (2006.01)
G02B 27/10 (2006.01)
G03B 21/28 (2006.01)

(52) U.S. Cl.
CPC ......... *G03B 21/145* (2013.01); *G03B 21/147* (2013.01); *G03B 21/2066* (2013.01); *G03B 21/28* (2013.01); *Y10T 29/49117* (2015.01)

(58) Field of Classification Search
CPC .. G03B 21/208; G03B 21/28; Y10T 29/49117
See application file for complete search history.

(56) References Cited

U.S. PATENT DOCUMENTS

| | | | |
|---|---|---|---|
| 2007/0284530 A1* | 12/2007 | Son | H04N 9/3129 250/336.1 |
| 2010/0232005 A1 | 9/2010 | Lescure et al. | |
| 2010/0315605 A1* | 12/2010 | Arita | G02B 26/0816 353/98 |
| 2011/0037953 A1* | 2/2011 | Nizani | G02B 3/005 353/38 |
| 2011/0205456 A1 | 8/2011 | Mizoguchi et al. | |
| 2011/0242498 A1* | 10/2011 | Kosaka | G02B 27/104 353/33 |

FOREIGN PATENT DOCUMENTS

| | | |
|---|---|---|
| JP | 2008-026661 | 2/2008 |
| JP | 2010-033012 | 2/2010 |
| JP | 2010-281904 | 12/2010 |

* cited by examiner

PROJECTION DEVICE COMBINING AND MODIFING LIGHT BEAM CROSS SECTIONAL DIMENSIONS

FIELD OF THE INVENTION

The present invention concerns a projection device which can project circular pixels onto a display screen. In particular, but not exclusively, the present invention concerns a projection device which is configured to project red, green and blue projection beams each of which have circular cross sections, wherein the circular cross section of each projection beam is dimensioned such that, at a predetermined distance from the projection device the circular cross sections of the projection beams are equal, so that the spot size of each of the projection beams is equal at the predetermined distance from the projection device, thereby enabling a circular pixel may be projected onto a display screen which is positioned at the predetermined distance from the projection device.

BACKGROUND TO THE INVENTION

A MEMS micro-mirror device is a device that contains an optical MEMS (Micro-Electrical-Mechanical-System). The optical MEMS may comprise a cylindrical, rectangular or square micro-mirror that is adapted to move and to deflect light over time. The micro-mirror is connected by torsion arms to a fixed part and can tilt and oscillate along one or two axis. For example, the micro-mirror can oscillate vertically and horizontally. Different actuation principles can be used to tilt and oscillate the micro-mirror, including electrostatic, thermal, electro-magnetic or piezo-electric. MEMS devices are known in which the area of these micro-mirrors are around a few $mm^2$. In this case, the dimensions of the MEMS device, comprising the packaging, is around ten $mm^2$. This device is usually made of silicon, and can be encapsulated in a package that can include the driving actuation electronics. Various optical components, such as for example, lenses, beam combiner, quarter-wave plates, beam splitter and laser chips, are assembled with the packaged MEMS to build a complete system.

A typical application of the micro-mirror devices is for projection systems. In a projection system, a 2-D, 3-D image or a video can be displayed on any type of display screen: each pixel is generated by combining modulated red, green and blue laser light sources, by means of, for example, a beam combiner. A MEMS micro-mirror device directs this beam of light to a display screen and reproduces the image, or the video, pixel-by-pixel. By means of its oscillations, the micro-mirror within the device will continuously scan light from left to right and/or right to left and from top to bottom and/or from bottom to top of the display screen so that each pixel of the 2-D image or video is displayed on the display screen.

For optimal image quality each pixel projected by the projection system should be circular. However, circular pixels are difficult to achieve since the projected light source diverges; in particular, the projected light source diverges an unequal amount along both the horizontal x-axis and vertical y-axis. Accordingly, the pixels projected on the display screen will be oval rather than circular in shape.

It is an aim of the present invention to obviate or mitigate at least some of the above-mentioned disadvantages.

BRIEF SUMMARY OF THE INVENTION

According to the invention there is provided, a projection device comprising, a red light source, a green light source, and a blue light source which can emit red, green and blue light respectively, a beam combiner which is configured such that it can combine light beams;

a means for collimating the light emitted from the red, green and blue light sources to provide red, green and blue collimated light beams, an optical modifier means, which is arranged such that the optical modifier means can receive the red, green and blue collimated light beams, and wherein the optical modifier means is configured to modify cross sectional dimensions of the red, green and blue collimated light beams to provide red, green and blue projection beams each of which has a circular cross section, and wherein the optical modifier means is configured, and the distances between the light sources and means for collimating are set, such that the dimensions of the circular cross sections of the red, green and blue projection beams are equal at a predetermined distance from the projection device such that the spot sizes of each of the red, green and blue projection beams are equal or have predefined sport sizes at the predetermined distance from the projection device;

a MEMS mirror which is configured such that it can oscillate about at least one oscillation axis to scan the red, green and blue projection beams across a projection screen which is positioned at the predetermined distance from the projection device.

It should be noted that the term circular cross section includes cross sections which are substantially circular; it will be understood that various sources of noise may affect the cross sections of the beams so that they are not perfectly circular, however in such cases the beams cross section will have a substantially circular cross section. However, the term circular cross section does not include oval-shaped cross section. The maximum accepted difference between the shortest and the longest diameters of the circular cross section is up to 25%; this means that the longest diameter cannot be more than 25% longer than the shortest diameter of the circular cross section.

The beam combiner may be arranged such that it can combine the red, green and blue collimated light beams to provide a combined collimated light beam which comprises the red, green and blue collimated light beams. The beam combiner may be arranged such that it can combine the red, green and blue projection beams to provide a combined projection beam which comprises the red, green and blue projection beams. Thus, the MEMS mirror will receive the red, green and blue projection beams in the form of a combined beam; and the MEMS mirror can oscillate to scan this combined beam across the projection screen.

The beam combiner may be arranged such that it is in optical communication with the means for collimating the light, such that the beam combiner can receive the red, green and blue collimated light beams from the means for collimating the light, and can combine the red, green and blue collimated light beams to provide a combined collimate light beam comprising the red, green and blue collimated light beams. Thus, the red, green and blue collimated light beams which the optical modifier means receives may be combined, rather than being individual beams.

The optical modifier means maybe arranged such that it is in optical communication with the beam combiner so that the optical modifier means can receive said combined collimated light beam from the beam combiner so that the optical modifier means can provide said red, green and blue projection beams. Said red, green and blue projection beams may be combined to define a combined projection beam comprising the red, green and blue projection beams.

The MEMS mirror may be arranged such that it is in optical communication with the optical modifier means such that the MEMS mirror can receive the red, green and blue projection beams. The MEMS mirror may be arranged such that it is in optical communication with the optical modifier means such that the MEMS mirror can receive the red, green and blue projection beams. The MEMS mirror may be configured to oscillate about its oscillation axis to scan light The beam combiner may be arranged such that it is in optical communication with the optical modifier means, such that the beam combiner can receive the red, green and blue projection beams, and combine the red, green and blue projection beams to provide a combined projection beam comprising the red, green and blue projection beams.

The beam combiner may comprise three or more deflectors each of which is arranged to deflect the red, green or blue collimated light beam it receives from one of the three collimating lenses, to the optical modifier means.

The MEMS mirror may be arranged such that it is in optical communication with the beam combiner such that the MEMS mirror can receive the combined projection beam.

The optical modifier means may be configured, and the distances between the light sources and means for collimating are set, such that the dimensions of the circular cross sections of the red, green and blue projection beams are equal at a predetermined distance from the projection device such that the spot sizes of each of the red, green and blue projection beams are equal at the predetermined distance from the projection device, so that a circular pixel may be projected onto a display screen which is positioned at the predetermined distance from the projection device.

By choosing the positioning of the means for collimating at a particular distance from the light sources, and by configuring the optical modifier means appropriately, a red, green and blue light beams will be provided with circular cross sections of dimensions which are necessary to ensure that, at a predetermined distance from the projection device, their cross sectional dimensions will be equal; thus ensuring that at said predetermined distance from the projection device the spot size of each of the red, green and blue projection beams will be equal. If the predetermined distance is set to be equal to the distance from the projection device to the display screen, then as each of the red, green, blue projected light beams have the same circular spot sizes at this distance, each pixel projected on the display screen will appear circular.

The means for collimating may comprise three collimating lenses each of which is arranged in optical communication with a respective light source, and wherein the optical modifier means may comprise at least one pair of lens, wherein the pair of lens is/are configured to modify cross sectional dimensions of the red, green and blue collimated light beams to provide red, green and blue projection beams each of which has a circular cross section, and wherein, the distance between the lenses of the pair, and the distance between each of the collimating lenses and their respective light sources, is such that the dimensions of the circular cross sections of the red, green and blue projection beams are equal at a predetermined distance from the projection device such that the spot size of each of the red, green and blue projection beams is equal at the predetermined distance from the projection device.

The two features of each of the collimating lenses which enable them to collimate light beams are, the refractive index difference between the air and lens (i.e. the refractive index difference between the air and lens at an interface between the air and lens) and the geometry of the surface of the lens. The physical feature of the lens which enables this refractive index difference to be achieved is the capacity of the propagation medium to change the light propagation speed; the speed of light in a medium is $v=c/n$, where c is the speed of light in vacuum and n is the refractive index of the material in which light propagates; the speed of light change is responsible for the light bending phenomenon which occurs in lenses. The collimating lenses do not need to have any particular refractive index but the most suitable refractive indexes to be used are comprised between 1 and 2.5. With regards to the geometry of the collimating lenses the lens surface can be planar, spherical or aspherical. Alternatively, the collimating lenses may have one or both sides curved. Each collimating lenses may comprise a D-ZLAF52LA (this is a type of glass which is widely used for moulded lenses manufacturing) which is used for its good glass moulding capabilities, and shape which is mainly aspheric. All glasses with low Tg temperature (transformation temperature) are suitable to be used as collimation lens glasses because of their mouldability features. Examples of other glass types which could be used are: N-FK51A, N-FK5, N-PK52A, P-BK7, N-PK51, N-KZFS2, P-SK57Q1, P-SK57, P-SK58A, P-SK60, N-KZFS4, N-KZFS11, N-KZFS5, P-SF8, P-LAK35, N-KZFS8, P-SF69, P-LAF37, N-LAF33, P-LASF47, P-LASF50, P-LASF51, SF57, P-SF68.

Advantageously, this solution has less light loss compared to some other solutions e.g. solutions which may use a beam restrictor (also called a beam spot or aperture stop or pinhole). Unlike other solutions very little light is lost at optical modifier and up to 95% of the light which is emitted from the light sources can be projected from the projection device to a display screen.

The beam combiner may further comprise three deflectors each of which is arranged to deflect and combine the red, green or blue collimated light beam it receives from one of the three collimating lenses, to the optical modifier means. The beam combiner may further comprise three deflectors each of which is arranged to deflect and combine the red, green and blue projection beams which it receives from the optical modifier means, so that the red, green and blue projection beams are deflected to the MEMS mirror.

The beam combiner may comprise a prism element. The beam combiner may comprise a prism element which is arranged to deflect and combine the red, green and blue collimated light beams which it receives from the three collimating lens, to the optical modifier means. The beam combiner may further comprise a prism element which is arranged to deflect and combine the red, green and blue projection beams which it receives from the optical modifier means, so that the red, green and blue projection beams are deflected to the MEMS mirror.

The optical modifier means may comprises a single pair of lens. Advantageously this minimises the number of components in the projection device. This enables the projection device to be more compact.

The optical modifier means may comprise three pairs of lens, wherein each pair of lens is configured to be in optical communication with one of the three collimating lenses, wherein each pair of lens are configured to modify cross sectional dimensions of the red, green or blue collimated light beams to provide red, green and blue projection beams each of which has a circular cross section, and wherein, the distance between the lenses of each pair, and the distance between each of the collimating lenses and their respective light sources, is such that the dimensions of the circular cross sections of the red, green and blue projection beams are set or equal at a predetermined distance from the projection device such that the spot size of each of the red, green and blue projection beams is equal or have predefined spot sizes, at the predetermined distance from the projection device.

The lenses of the optical modifier means may each be configured to be telescopic lenses. The lenses of the optical modifier means may each be configured to have a magnification or reduction factor between 1 to 10. The lenses of the optical modifier means may be configured to have a focal length between 0.1 mm to 10 mm for a convex shaped lens and between −0.1 mm to −10 mm for a concave shaped lens. These magnification factors and focal lengths enables the optical modifier means to modify the cross sectional dimensions of the red, green and blue collimated light beams to provide red, green and blue projection beams each of which has a circular cross section.

A first lens of the lens pair may be configured such that it can expand a light beam along a first axis and/or second axis; the first and second axes may be orthogonal to one another; the physical characteristic of the first lens which enables it to expand a light beam along a first axis and/or second axis is the curvature of the lens. If the curvature of the lens is only along one axis (cylindrical lens), then the light beam will be modified along the same axis and remain unchanged along the other axis. If the lens expands along both axes then the lens modifies the light beam differently along each of the first and second axis; for example it may be that the light beam is enlarged or reduced in both axis but with different amplitudes. The second lens of the lens pair may be configured such that it can focus a light beam along a first axis and/or second axis; the first and second axes may be orthogonal to one another. The physical characteristic of the second lens which enables it to focus a light beam along a first axis and/or second axis is the curvature of the lens. In each of the pair of lenses, the first lens of the pair may be the lens which is first to receive the collimated light beam from the collimating lens. The second lens of the pair may be the lens which receives light form the first lens. Alternatively, the second lens of the lens pair may be configured such that it can expand a light beam along a first axis and/or second axis; the first and second axes may be orthogonal to one another. The first lens of the lens pair may be configured such that it can focus a light beam along a first axis and/or second axis; the first and second axes may be orthogonal to one another.

Each collimating lens may be an aspheric lens.

Each of the lenses of the optical modifier means may be cylindrical lens. The cylindrical lens may comprise a portion which is semi-cylindrical. Preferably, a cylindrical lens comprises a first planar surface on which light is incident and a second surface which has a semi-circular cross section through which light is emitted. The first planar surface may be defined by a cuboid lens portion and the second surface which has a semi-circular cross section may be defined by a semi-cylindrical lens portion.

A cylindrical lens is a lens which is configured to focus light which passes through it onto a line instead of on to a point, as a spherical lens would. A cylindrical lens comprises a curved face, or faces of a cylindrical lens are sections of a cylinder, and these faces focus the light which passes through it onto a line parallel to the intersection of the surface of the lens and a plane tangent to it; the lens is configured to focus the light in the direction perpendicular to this line, and leaves it unaltered in the direction parallel to it (in the tangent plane). Preferably the cylindrical lenses used in the present invention are configured to focus light to a line, or to change the aspect ratio of an image. The cylindrical lenses each may comprise a single cylindrical surface which causes incoming light to be focused in only a single dimension, stretching the image. The cylindrical lenses may be configured to comprise positive or negative focal lengths.

Preferably the present cylindrical lenses may comprise at least one of, Plano-convex (PCX) spherical singlet lens, Double-convex (DCX) spherical singlet lens, Plano-concave (PCV) spherical singlet lens, Double-concave (DCV) spherical singlet lens, Aspheric lenses, Plano-convex (PCX) cylinder lens, Plano-concave (PCV) cylinder lens.

For example, there may be provided a projection device comprising, a red light source; a green light source; blue light source; and means for collimating which comprises, a first light collimator arranged in optical communication with the red light source so that that red light emitted from the red light source can be collimated to provide a red light beam, a second light collimator arranged in optical communication with the green light source so that that green light emitted from the green light source can be collimated to provide a green light beam, and a third light collimator arranged in optical communication with the blue light source so that that blue light emitted from the blue light source can be collimated to provide a blue light beam; and wherein the projection device further comprises an optical modifier means which comprises a lens arrangement which is arranged in to receive the red light beam, green light beam, and blue light beam, and wherein the lens arrangement is configured to modify each of the light beams to provide each of the light beams with a circular cross section, and wherein, the optical modifier is configured, and the distance between each of the first, second and third light collimators and the light sources, and the distance between each of the each of the first, second and third light collimators and the lens arrangement, is such that the dimensions of the circular cross sections of the red, green and blue projection beams are set to a predetermined size or are equal at a predetermined distance from the projection device such that the spot size of each of the red, green and blue projection beams is set to a predetermined size or are equal at the predetermined distance from the projection device.

The projection device may further comprises a first deflector to deflect the red light beam to the lens arrangement, and a second deflector to deflect the green light beam to the lens arrangement, and a third deflector to deflect the blue light to the lens arrangement.

The projection device may further comprise a prism element which is arranged in optical communication with each of the first, second and third light collimators, such that the prism element can receive each of the red light beam, green light beam and blue light beam, and wherein the prism element is further configured to deflect each of the light beams to the lens arrangement.

The lens arrangement may comprises a first, second a third pairs of lens, wherein, the first pair of lens is arranged in optical communication with the first light collimator, and wherein the first pair of lens are figured to modify the red light beam which is emitted from the first light collimator to provide a red light projection beam with a circular cross section, the second pair of lens is arranged in optical communication with the second light collimator, and wherein the second pair of lens are figured to modify the green light beam which is emitted from the second light collimator to provide a green light projection beam with a circular cross section, and wherein the third pair of lens is arranged in optical communication with the third light collimator, and wherein the third pair of lens are configured to modify the blue light beam which is emitted from the third light collimator to provide a blue light projection beam with a circular cross section, and wherein the distance between the red light source and the first light collimator, and the distance between the lenses which define the first pair of lens, and the distance between the green light source and the first light collimator, and the distance between the lenses which define the second pair of lens, and the distance between the blue light source and the third light collimator, and the distance between the lenses which define the third pair of lens, is such that the dimensions of the circular cross sections of the red, green and blue projection beams are equal at a predetermined distance from the projection device such that the spot size of each of the red, green and blue projection beams is equal or set/defined at the predetermined distance from the projection device.

The distances between the red light source and the first light collimator is preferably between 0 mm (i.e. direct contact)-0.5 mm (e.g. when the red light source is not contained in a package) and between 0.5-5 mm (e.g. when the red light source is contained in a package), and the distance between the lens in the first pair of lens is preferably between 0 mm (i.e. direct contact)-5 mm, and the distance between the green light source and the first light collimator is preferably between 0 mm (i.e. direct contact)-0.5 mm (e.g. when the green light source is not contained in a package) and between 0.5 to 5 mm (e.g. when the green light source is contained in a package), and the distance between the lens in the second pair of lens is preferably between 0.01 to 5 mm (e.g. when the green light source is not contained in a package), and the distance between the blue light source and the third light collimator is preferably between 0.01 to 0.5 mm (e.g. when the blue light source is not contained in a package) or between 0.5 to 5 mm (e.g. when the blue light source is contained in a package), and the distance between the lens in the third pair of lens is preferably between 0.01-5 mm. The predetermined distance from the projection device at which the spot sizes of each of the red, green and blue projection beams are equal, is preferably between 0.1-3 mm.

Each of the first, second and third pairs of lenses, may be configured to expand the light projection beams which pass through them so as to increase the spot size of each of the light projection beams. Each of the first, second and third pairs of lenses, may be configured to expand the light projection beams along a first axis. Each of the first, second and third pairs of lenses, may be configured to expand the light projection beams along a second axis. Each of the first, second and third pairs of lenses, may be configured to expand the light projection beams along a first and second axis. The first and second axis may be orthogonal to one another.

Each of the first, second and third pairs of lens, may be configured to focus the light projection beams which pass through them so as to decreases the spot size of each of the light projection beams.

Each of the first, second and third pairs of lenses, may be configured to shrink or focus the light projection beams which pass through them. Each of the first, second and third pairs of lenses, may be configured to shrink or focus the light projection beams along a first axis. Each of the first, second and third pairs of lenses, may be configured to shrink the light projection beams along a second axis. Each of the first, second and third pairs of lenses, may be configured to shrink of focus the light projection beams along a first and second axis. The first and second axis may be orthogonal to one another.

Each of the lenses which define the first, second and third pairs of lens, may be a plano convex (PCX) cylinder lens or a plano concave (PCV) cylinder lens. The curvature shape of the cylinder lens may be spherical or aspherical.

Each of the first light collimator, second light collimator, and third light collimator, may be defined by an aspheric lens The optical modifier means may comprise a first, second and third beam restrictor, wherein the first beam restrictor comprises a first circular pin-hole through which a portion of the red collimated light beam can pass to provide a red projection beam with a circular cross section; wherein the second beam restrictor comprises a second circular pin-hole through which a portion of the green collimated light beam can pass to provide a green projection beam with a circular cross section; and wherein the third beam restrictor comprises a third circular pin-hole through which a portion of the blue collimated light beam can pass to provide a blue projection beam with a circular cross section;

wherein the optical modifier means may be configured so that the first, second and third circular pin-holes are dimensioned such that the dimensions of the circular cross sections of the red, green and blue projection beams are equal at a predetermined distance from the projection device such that the spot size of each of the red, green and blue projection beams is equal or have predefined spot sizes at the predetermined distance from the projection device.

Advantageously, this embodiment is cheap and easy to implement as fewer lens are required.

For example, there may be provided a projection device comprising, a red light source; a green light source; a blue light source; a means for collimating which comprises, a first light collimator arranged in optical communication with the red light source so that that red light emitted from the red light source can be collimated to provide a red light beam, a second light collimator arranged in optical communication with the green light source so that that green light emitted from the green light source can be collimated to provide a green light beam, and a third light collimator arranged in optical communication with the blue light source so that that blue light emitted from the blue light source can be collimated to provide a blue light beam; and an optical modifier means, comprising a first beam restrictor arranged in optical communication with the first light collimator, which comprises a first circular pin-hole through which a portion of the red light beam which is emitted from the first light collimator can pass to provide a red projection beam with a circular cross section, a second beam restrictor arranged in optical communication with the second light collimator, which comprises a second circular pin-hole through which a portion of the green light beam which is emitted from the second light collimator can pass to provide a green projection beam with a circular cross section, a third beam restrictor arranged in optical communication with the third light collimator, which comprises a third circular pin-hole through which a portion of blue light beam which is emitted from the third light collimator can pass to provide a blue projection beam with a circular cross section; wherein the distance between each light source and each collimator is set, and the first, second and third circular pin-holes are dimensioned, such that the dimensions of the circular cross sections of the red, green and blue projection beams are equal at a predetermined distance from the projection device such that the spot size of each of the red, green and blue projection beams is equal or have predefined sport sizes, at the predetermined distance from the projection device.

Preferably the first, second and third pin holes are circular. Preferably the first pin hole has a diameter between 0.5-1 mm; the second pin hole has a diameter between 0.4-0.9 mm; and the third pin hole has a diameter between 0.3-0.8 mm. Most preferably the first pin hole has a diameter of 0.75 mm; the second pin hole has a diameter of 0.65 mm; and the third pin hole has a diameter between 0.55 mm. Preferably, the pin-hole size is different for each light source because the wavelength difference between the light sources induce different beam divergence angle for each of them.

The means for collimating and the optical modifier means may be defined collectively by a three pairs of lens, each pair of lens being arranged in optical communication with a respective light source, and each lens of a pair being arranged in optical communication with each other, wherein a first lens of each pair is configured to collimate light along a first axis, and a second lens of each pair is configured to collimate light along a second axis which is perpendicular to the first axis, to provide red, green and blue projection beams each of which has a circular cross section, and wherein the distances between the first and second lens of each pair, and the distances between each light source and the first and second lenses of the respective lens pair with which that light source can optically communicate, is such that the dimensions of the circular cross sections of the red, green and blue projection beams are equal at a predetermined distance from the projection device such that the spot size of each of the red, green and blue projection beams is equal at the predetermined distance from the projection device.

Collimating along two perpendicular axis, e.g. along the horizontal x-axis and vertical y-axis will achieve both collimation of the light beams and also provide the light beams with a circular cross section. The optical properties of the first or second lens in each pair may be configured to collimate light along a first axis and the other lens in the pair may be configured to collimate light along a second axis; this will enable the lens pair to convert the oval cross section of the light beams which are emitted from the light source to a circular cross section. The first and second lenses are each configured so that the focal point of the first and second collimation lens is placed at the laser light emission point so that the first and second lenses are each configured to collimate light along the first and second axis respectively. For example, if the red light emitted from the red light source is oval, having a larger diameter along the horizontal x-axis compared to the vertical y-axis, corresponding to a larger divergence angle in the x-axis compared to the y-axis, then the lens which collimates along the x-axis should be configured to have a shorter focal length than the lens of the pair which collimates along the y-axis. As a result the oval light beam emitted from the red light source will be collimated firstly along the x-axis and secondly along the y-axis and therefore the collimation lens of the oval light beam, along its x-axis, is placed before the collimation lens of the oval light beam along the y-axis.

The closer that a lens is to a light source then the shorter focal length of the lens which is required in order to collimate the light beam from the light source. The shorter the distance between the light source and lens the less the light beam from the light source will have enlarged before reaching the lens end being collimated.

By choosing the appropriate optical characteristics of the lenses in each pair to achieve a light beam with a circular cross section, and by setting the appropriate distance between the lenses of each pair and the appropriate distance between each light source and each of the lenses of a lens pair, the dimensions of the circular cross sections of the red, green and blue projection beams can be made to be set to a predetermined size at a predetermined distance from the projection device such that the spot size of each of the red, green and blue projection beams is equal at the predetermined distance from the projection device. The focal length of the lens determine at which distance the lens needs to be placed in order to collimate the light, if the focal length is larger, the distance between the collimation lens and the light source is larger and the diameter of the collimated light beam will be larger also. In the other hand if the collimation lens focal length is shorter the distance between the collimation lens and the light source is shorter and the collimated light beam diameter is shorter also.

The relationship between the collimation lens and light source distance (d), the lens focal length (f), the laser diode emission divergence in degree at Full Width Half Maximum "FWHM" (θ), the light source wavelength (λ), the collimated light beam diameter at $1/e^2$ gaussian intensity profile (D) and the laser divergence in mrad (φ) is:

$$f=d$$

$$D=2*f*\mathrm{Sin}(0.85*\theta)$$

$$\phi=2*\lambda/(\pi*D)$$

The relationship between the lens pair distance (L), the lens pair focal lengths (f1 and f2), the collimated beam input (D1) and output (D2) diameter and the input (φ1) and output (φ2) divergence in mrad is:

$$L=f1+f2$$

$$D2=D1*(-f1/f2)$$

$$\phi1=2*\lambda/(\pi*D1),$$

$$\phi2=2*\lambda/(\pi*D2)$$

The relationship between the collimated beam spot size at $1/e^2$ Gaussian intensity profile (B), the lens pair output beam diameter (D2) and the distance (z) is:

$$zr=(\pi*(D2/2)^2)/\lambda$$

$$B(z)=(D2/2)*\mathrm{sqrt}(1+(z/zr)^2)$$

The distance between the first lens of the lens pair and the collimation lens do not influence the functionality of pair lens but, a shorter distance will reduce the overall system length and therefore the final solution volume.

Preferably the predefined distance at which spot sizes are equal is 0.1 m to 3 m from the projection device.

For example, there may be provided a projection device comprising, a red light source; a green light source; a blue light source; a means for collimating, wherein the means for collimating and the optical modifier means is defined by a first, second, third, fourth, fifth and sixth light collimator, wherein the first light collimator is configured to collimate light along a first axis, arranged in optical communication with the red light source so that that red light emitted from the red light source can be collimated along a first axis to provide an intermediate red light projection beam, and the second light collimator is configured to collimate light along a second axis which is perpendicular to the first axis, arranged in optical communication with the first light collimator so that the intermediate red light projection beam can be collimated along a second axis which is perpendicular to the first axis, to provide an red light projection beam which has a circular cross section;

the third light collimator is configured to collimate light along a first axis, arranged in optical communication with the green light source so that that green light emitted from the red light source can be collimated along a first axis to provide an intermediate green light projection beam, and the fourth light collimator is configured to collimate light along a second axis which is perpendicular to the first axis, arranged in optical communication with the third light collimator so that that the intermediate green light projection beam can be collimated along a second axis which is perpendicular to the first axis, to provide a green light projection beam which has a circular cross section;

the fifth light collimator is configured to collimate light along a first axis, arranged in optical communication with the blue light source so that that blue light emitted from the blue light source can be collimated along a first axis to provide an intermediate blue light projection beam, and the sixth light collimator is configured to collimate light along a second axis which is perpendicular to the first axis, arranged in optical communication with the fifth light collimator so that that the intermediate blue light projection beam can be collimated along a second axis which is perpendicular to the first axis, to provide a blue light projection beam which has a circular cross section, a beam combiner which is configured such that it can combine the projection beams;

a MEMS mirror which is configured such that it can oscillate about at least one oscillation axis to scan the red, green and blue projection beams across a projection screen which is positioned at a predetermined distance from the projection device;

and wherein the distances between red light source, first light collimator and second light collimator, and the distances green light source, third light collimator and fourth light collimator and the distances the blue light source, fifth light collimator and sixth light collimator are such that the dimensions of the circular cross sections of the red, green and blue projection beams are equal at the predetermined distance from the projection device such that the spot size of each of the red, green and blue projection beams is equal at the predetermined distance from the projection device.

The ratio between the two collimation lenses focal lengths (f1 and f2) and the light source divergence angles ($\theta 1$ and $\theta 2$) and the light beam collimated beam size at $1/e^2$ Gaussian intensity for both collimation axis (B1 and B2) is:

$$\Theta 1/\Theta 2 = f1/f2$$

$$B1 = 2*f1*\mathrm{Sin}(0.85*\theta)$$

$$B2 = 2*f2*\mathrm{Sin}(0.85*\theta)$$

The relationship between the two collimated beam spot sizes at $1/e^2$ Gaussian intensity profile (B1 and B2) and the distance (z) is:

$$Zr1 = (\pi*(B1/2)^2)/\lambda$$

$$B1(z) = (B1/2)*\mathrm{sqrt}(1+(z/Zr1)^2)$$

$$Zr2 = (\pi*(B2/2)^2)/\lambda$$

$$B12z) = (B2/2)*\mathrm{sqrt}(1+(z/Zr2)^2)$$

The first, second, third, fourth, fifth and sixth light collimators may each be cylindrical lenses. Preferably the first, second, third, fourth, fifth and sixth light collimators comprise plano convex cylindrical lens.

According to a further aspect of the present invention there is provided a module for a projection device comprising, a housing;

a red, green or blue light source, fixed within the housing; and a means for collimating, which is fixed with the housing and arranged such that it is in optical communication with the light source, and wherein the means for collimating is positioned to a predetermined distance from the light source so as to ensure that a spot size of predefined dimensions can be obtained at a predefined distance from the module, and wherein the housing further comprises a connecting means which enables the module to be operably connected within a projection device.

The module may further comprise an optical modifier means arranged within the housing such that it can optically communicate with the means for collimating, and wherein the optical modifier means is configured such that it can modify the cross sectional dimensions of the collimated light beams to provide projection beam which have a circular cross section. The technical name of the lens is plano-convex (PCX) cylinder lens.

The module may further comprise a beam combiner which is configured such that it can combine the light beams. Preferably the beam combiner is arranged such that it can combine collimated light beams emitted from the means for collimating. Preferably the beam combiner is arranged such that it can combine projection light beams emitted from the optical modifier means. The beam combiner may comprise a prism. The beam combiner may comprise three deflector mirrors which are arranged to deflect and combine light beams.

The module may further comprise a MEMS mirror which is configured such that it can oscillate about at least one oscillation axis to scan the red, green and blue projection beams across a projection screen. Preferably the projection screen is positioned at the predetermined distance from the projection device.

The beam combiner may be arranged in any of the manners mentioned above for the projection device. The MEMS mirror may be arranged in any of the manners mentioned above for the projection device.

According to a further aspect of the present invention there is provided a projection device comprising a module according to any one of the above-mentioned modules.

According to a further aspect of the present invention there is provided a method of manufacturing a projection device comprising the step of operably connecting one or more modules according to any one of the above-mentioned modules within a housing of a projection device.

According to a further aspect of the present invention there is provided, the use of a module according to any one of the above-mentioned modules to manufacture a projection device.

BRIEF DESCRIPTION OF THE DRAWINGS

The invention will be better understood with the aid of the description of embodiments of the invention, which is given by way of example only, and illustrated by the figures, in which.

DETAILED DESCRIPTION OF POSSIBLE EMBODIMENTS OF THE INVENTION

Figure 1A:
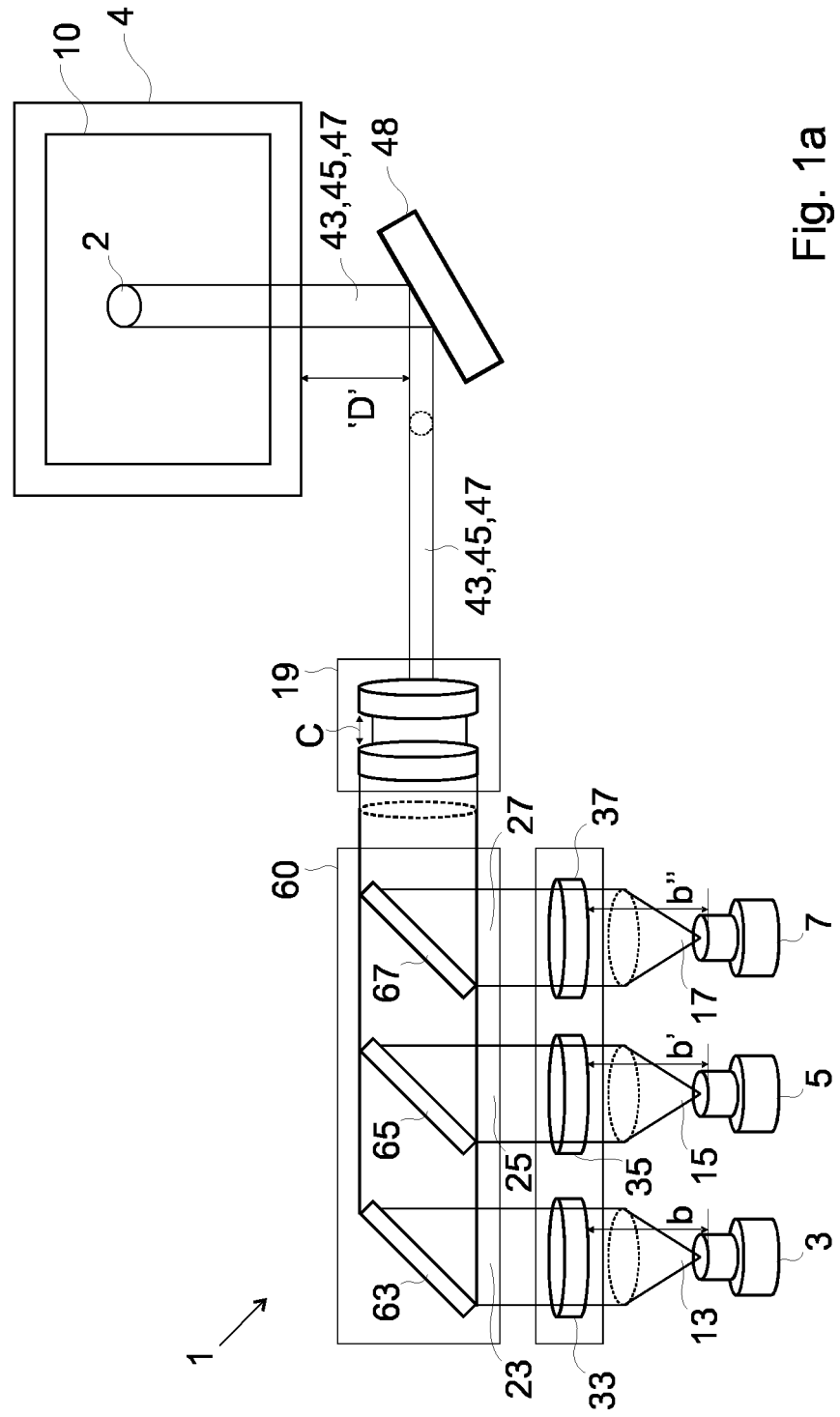
FIG. 1a provides a perspective view of a projection device according to a first embodiment of the present invention.

FIG. 1a provides a perspective view of a projection device 1 according to a first embodiment of the present invention. The projection device 1 is shown to project a pixel 2 onto a display screen 4 which is positioned a predefined distance 'D' away from the projection device 1. The pixel 2 defines part of a 2-D image 10 which is projected by the projection device 1 onto the display screen 4.

The projection device 1 comprises, a red light source 3, a green light source 5, and a blue light source 7 which can emit red, green and blue light 13,15,17 respectively.

The projection device 1 comprises a means for collimating 9 the light emitted from the red, green and blue light sources 3,5,7 to provide red, green and blue collimated light beams 23,25,27. The means for collimating 9 comprises three collimating lenses 33,35,37 each of which is arranged in optical communication with a respective light source 3,5,7.

An optical modifier means 19, is arranged to be in optical communication with the means for collimating 9 such that the optical modifier means 19 can receive the red, green and blue collimated light beams 23,25,27. The optical modifier means 19 is configured to modify cross sectional dimensions of the red, green and blue collimated light beams 23,25,27 to provide red, green and blue projection beams 43,45,47 (which are shown in FIG. 1 to be overlapping) each of which has a circular cross section. These projection beams 43,45,47 collectively defined the pixel 2 projected on the display screen 4.

The projection device 1 further comprises a beam combiner 60 in which comprises three deflectors 63,65,67. The three deflectors 63,65,67 each of which is arranged to combine the red, green and blue collimated light beams 23,25,27 they receive from one of the three collimating lenses 33,35,37 and to deflect the combined red, green and blue collimated light beams 23,25,27 to the optical modifier means 19.

In this example the optical modifier means 19 comprises a single pair 53 of lens 55,57 which receive all the collimated light beams 23,25,27. Advantageously, this minimises the number of components in the projection device 1, which in turn enables the projection device 1 to be more compact.

The pair 53 of lens 55,57 is configured to modify cross sectional dimensions of the red, green and blue collimated light beams 23,25,27 to provide red, green and blue projection beams 43,45,47 each of which has a circular cross section. Preferably each lens 55,57 is a plano-convex achromatic cylindrical lens (0.1 mm to 10 mm focal length) and a plano-concave achromatic cylindrical lens (−0.1 mm to −10 mm focal length) The distance 'c' between the lenses 55,57 of the pair 53, and the distances b,b',b" between each of the collimating lenses 33,35,37 and the respective light sources 3,5,7, is such that the dimensions of the circular cross sections of the red, green and blue projection beams 43,45,47 are of predetermined size or preferably are equal, at the predetermined distance 'D' away from the projection device 1. Preferably the distance 'c' is between 0.1 mm to 10 mm and the distances b,b',b" are between 0.01 mm to 0.5 mm. Therefore at the predetermined distance 'D' away from the projection device 1 the spot size of each of the red, green and blue projection beams 43,45,47 is as defined and ideally equal. Since the cross section of each of the red, green and blue projection beams 43,45,47 is circular or at least relatively circular and since the size of the spot size of each of the red, green and blue projection beams 43,45,47 is equal at the distance 'D' away from the projection device, the pixel 2 which is projected on the display screen 4 which is a distance 'D' away from the projection device will have a circular cross section. Preferably the predetermined distance 'D' is between 0.1 m to 3 m.

The red, green and blue projection beams 43,45,47 are passed from the optical modifier means 19 to a MEMS mirror 48. In this particular example the MEMS mirror 48 is configured such that it can oscillate about two orthogonal oscillation axes to scan the red, green and blue projection beams 43,45,47 across the display screen 4 so as to display the image 10. The MEMS mirror 48 is configured to oscillate about a first oscillation axis to scan light horizontally across the display screen 4 and the MEMS mirror 48 is configured to oscillate about a second oscillation axis to scan light vertically across the display screen 4. Typically the MEMS mirror 48 is arranged such that it is at 45° relative to the light which is incident on the MEMS mirror.

Advantageously, this solution has less light loss compared to some other solutions e.g. solutions which have optical modifier means which comprise one or more beam restrictors. Unlike these other solutions very little light is lost at the optical modifier mean 19 and up to 95% of the light which is emitted from the light sources 3,5,7 can be projected from the projection device 1 to a display screen 4.

Figure 1C:
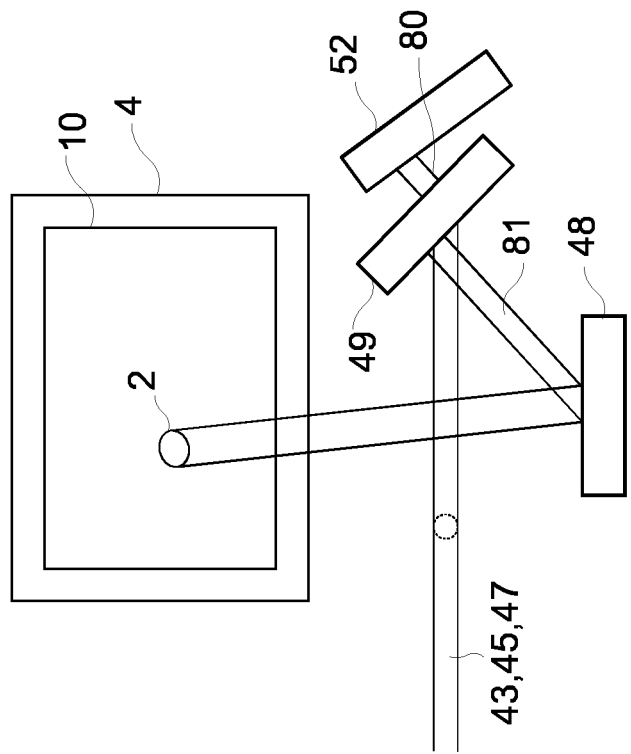
FIG. 1c provides a perspective view of some of the components of the projection device according to with FIG. 1a, and their cooperation with a photodiode and semi-reflective component.
Figure 1B:
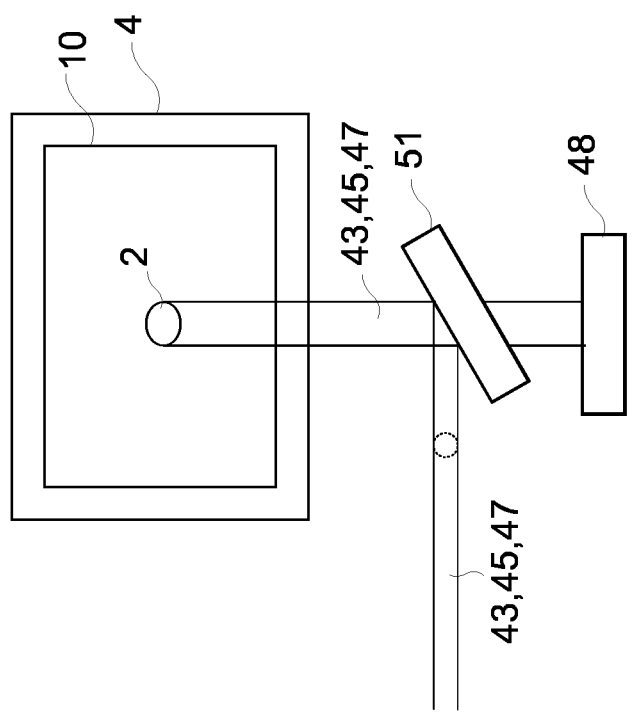
FIG. 1b provides a perspective view of some of the components of the projection device according to with FIG. 1a, and their cooperation with a beam splitter component.

As shown in FIG. 1b the projection device may further comprise a beam splitter 51. The beam splitter 51 is positioned such that it receives the red, green and blue projection beams 43,45,47 from the optical modifier means 19; The beam splitter 51 splits the red, green and blue projection beams 43,45,47 and passes a portion of these projections beams to the MEMS mirror 48 and another portion of these beams directly to the display screen 4. The beam splitter 51 typically allows some light to pass through it and some light to be reflected. In our case, the beam splitter 51 can typically have 1% of light passing through and 99% of light reflected.

As shown in FIG. 1c the projection device may further comprise a photodiode 52. A semi-reflective optical component 49 is positioned to receive the red, green and blue projection beams 43,45,47 from the optical modifier means 19; a portion 80 of the red, green and blue projection beams 43,45,47 pass through the semi-reflective optical component 49 and is received by the photodiode 52, another portion 81 is reflected by the semi-reflective optical component 49 to the MEMS mirror 48. The portion 80 of the light which passes through the semi-reflective optical component 49 and is received by the photodiode 52 may be processed by the photodiode 52. The photodiode 52 may be used to sense the light intensity of each of the light sources and/or to sense the position of the light sources (for alignment purpose).

Figure 2:
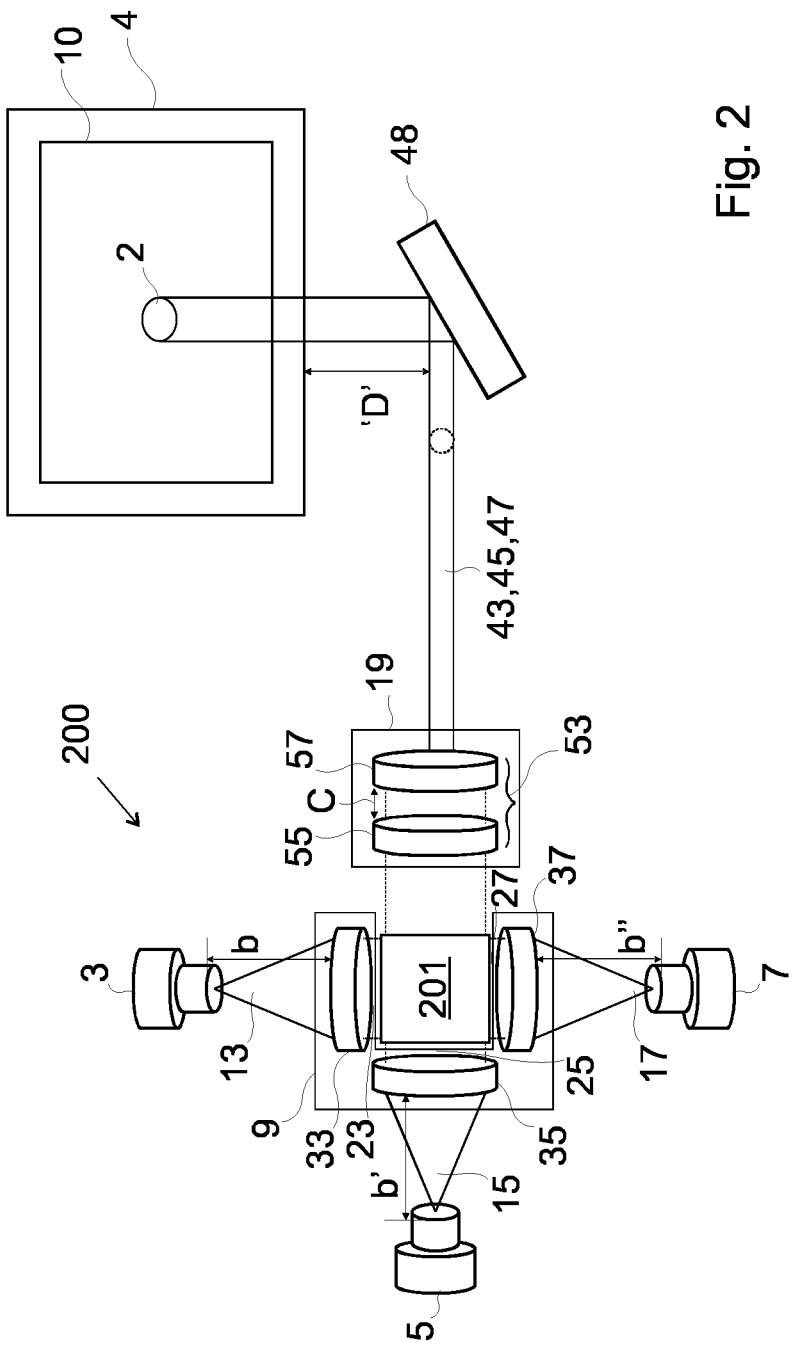
FIG. 2 provides a perspective view of a projection device according to a further embodiment of the present invention.

FIG. 2 provides a perspective view of a projection device 200 according to a second embodiment of the present invention. The projection device 200 comprises many of the same features of the projection device 1 shown in FIG. 1 and like features are awarded the same reference numerals.

The projection device comprises beam combiner 201 in the form of a prism element 201 which is arranged to deflect and combine the red, green and blue collimated light beams 23,25,27 which it receives from the three collimating lenses 33,35,37, to the optical modifier means 19.

Figure 3:
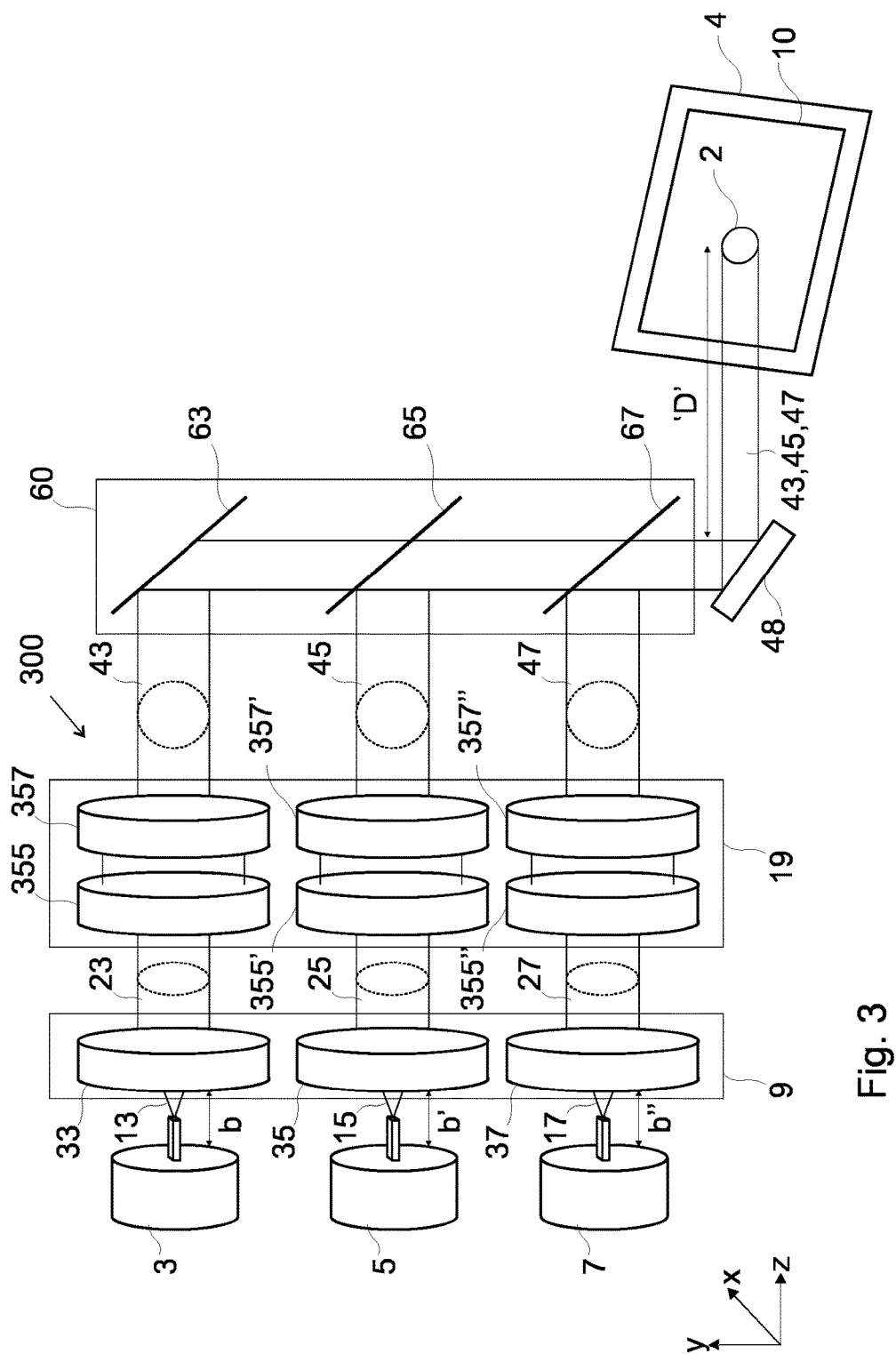
FIG. 3 provides a perspective view of a projection device according to a further embodiment of the present invention.

FIG. 3 provides a perspective view of a projection device 300 according to a third embodiment of the present invention; The projection device 300 comprises many of the same features of the projection device 1 shown in FIG. 1 and like features are awarded the same reference numerals. In the projection device 300 the means for collimating 9 is in direct optical communication with the optical modifier means 19.

The projection device 300 comprises a beam combiner 60 as used in the embodiment shown in FIG. 1. The beam combiner 60 comprises deflectors 63, 65 and 67 are provided to direct the light beam to the MEMS mirror 48 and to combine the red, green and blue projection beams 43,45,47; alternatively the beam combiner could be defined by a prism component 201 as used in the embodiment shown in FIG. 2.

In the projection device 300 optical modifier means 19 comprises three pairs of lens 301,303,305, wherein each lens pair 301,303,305, is configured to be in optical communication with one of the three collimating lenses 33,35,37. Each lens pair 301,303,305 is configured to modify the cross sectional dimensions of the red, green or blue collimated light beams 23,25,27 to provide red, green and blue projection beams 43,45,47 each of which has a circular cross section, and the distances c, c', c" between the lenses of each pair 301,303,305, and the distances b,b',b" between each of the collimating lenses 33,35,37 and their respective light sources 3,5,7, is such that the dimensions of the circular cross sections of the red, green and blue projection beams 43,45,47 are equal at the predetermined distance 'D' from the projection device 1. Since the cross section of each of the red, green and blue projection beams 43,45,47 is circular and since the size of the spot size of each of the red, green and blue projection beams 43,45,47 is equal at the distance 'D' away from the projection device, the pixel 2 which is projected on the display screen 4 which is a distance 'D' away from the projection device 300 will have a circular cross section.

Preferably the distances c, c', c" are between 0.1 mm to 10 mm Preferably the distances b,b % b'" are between 0.01 mm to 0.5 mm (for solution No 3)

In the projection device 300 shown in FIG. 3 a first lens 355, 355',355" of each lens pair 301,303,305, is configured such that it can expand a light beam a first x-axis and/or along a second y-axis so as to increase the cross section of the light beams; and a second lens 357,357',357" of each lens pair 301,303,305 is configured such that it can collimate a light beam along a first x-axis and/or along a second y-axis (according to the reference axis provided in FIG. 3). Preferably the second lens 357,357',357" of each lens pair 301,303,305 is configured to collimate light on the same cross section as expanded by the first lens; in other words the second lens will modify the beam along the same axis as the first lens; for example say that the first lens expands the beam along the x-axis, then the second lens will collimate the beam along the x-axis. More specifically, the first lens 355, 355',355" of each lens pair 301,303,305, is a plano concave cylindrical lens which is configured to have a negative focal length; this enables the lens to expand the light beams. The second lens is also a plano convex cylindrical lens which is configured to have a positive focal length; this enables the second lens collimate the light. In each of the pair of lenses 301,303,305, the first lens of the pair 301,303,305 may be the lens which is first to receive the collimated light beam 23,25,27 from the collimating lenses 33,35,37; the second lens 357,357',357" of the pair 301,303, 305 may be the lens which receives light directly from the first lens 355, 355',355".

Figure 4A:
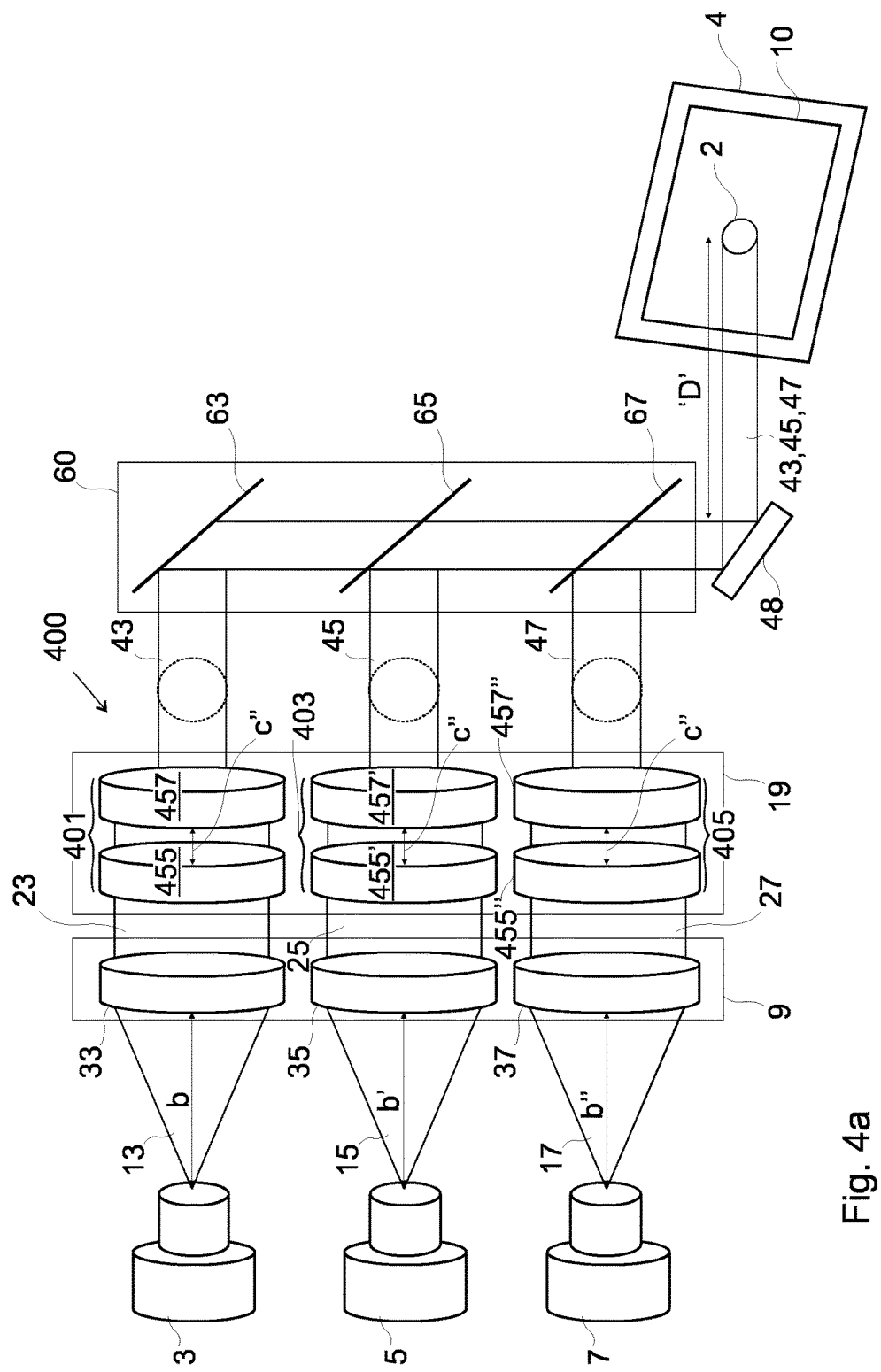
FIG. 4a provides a perspective view of a projection device according to a further embodiment of the present invention.

FIG. 4a provides a perspective view of a projection device 400 according to a further embodiment of the present invention. The projection device 400 comprises many of the same features of the projection device 300 shown in FIG. 3 and like features are awarded the same reference numerals.

In the projection device 400 the first lens 455,455',455" of the lens pair 401,403,405 is configured in a similar manner to the second lenses 357,357',357" of the device 300 shown in FIG. 3, so that they can collimate light beams. The second lens 457,457',457" of each lens pair 401,403,405 is configured in a similar manner to the first lenses 355, 355',355" of the device 300 shown in FIG. 3, so that they can expand light along one single axis (x or y depending on the orientation of the light source). Advantageously, this embodiment allows for the mean for collimating 9 to be positioned further away from the light sources 3,5,7; this will typically mean that 'off-the-shelf' light sources will not need to be modified to enable the means for collimating 9 to be positioned close enough to the light sources 3,5,7 to enable the projection device 400 to project a circular pixel 2.

In each of the above-mentioned embodiments each collimating lenses 33,35,37 may each be aspheric lenses and each of the first and second lenses 55,57,355,355',355",357, 357',357",455,455', 455",457,457', 457", of the optical modifier means 19, may be a cylindrical lenses. A cylindrical lens is a lens which has a portion which is semi-cylindrical. Preferably, a cylindrical lens is a lens which has a first surface which has a semi-circular cross section on which light is incident and a second planar surface through which light is emitted. The first surface may be defined by a portion and the second surface which has a cross section may be defined by.

Figure 4B:
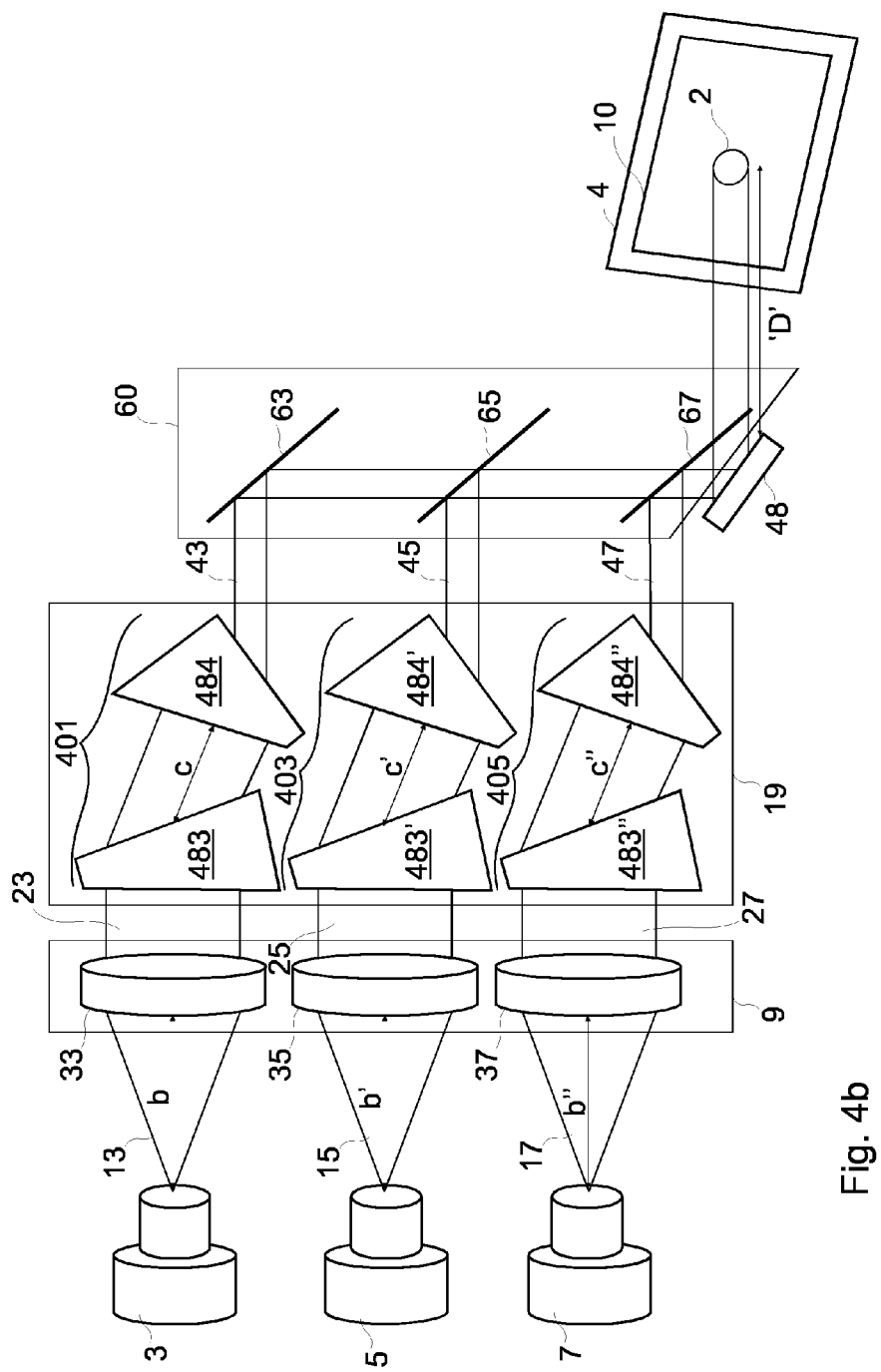
FIG. 4b provides a perspective view of a projection device according to a further embodiment of the present invention.

FIG. 4b provides a perspective view of a projection device 480 according to a further embodiment of the present invention. The projection device 480 comprises many of the same features of the projection device 400 shown in FIG. 4 and like features are awarded the same reference numerals.

In the projection device 480 the lens pairs 401,403,405 each comprise a first and second prism 483,483',483",484, 484',484". Each of the prisms 483,483',483",484,484',484" change the diameter of the beam which pass through them, along one direction. For example, the first prisms 483,483', 483" change the diameter of the collimated red, green and blue light beams 23,25,27 along the x-axis; and the second prisms 484,484',484" change the diameter of the collimated red, green and blue light beams 23,25,27 along the x-axis as well. In fact each prism couple may be used to change the spot size of the light in one direction only; in theory only one prism could be used for this but with two prisms it is possible to ensure that the input and output beam are parallel to each other, and also small spot sizes can be achieved.

Figure 5:
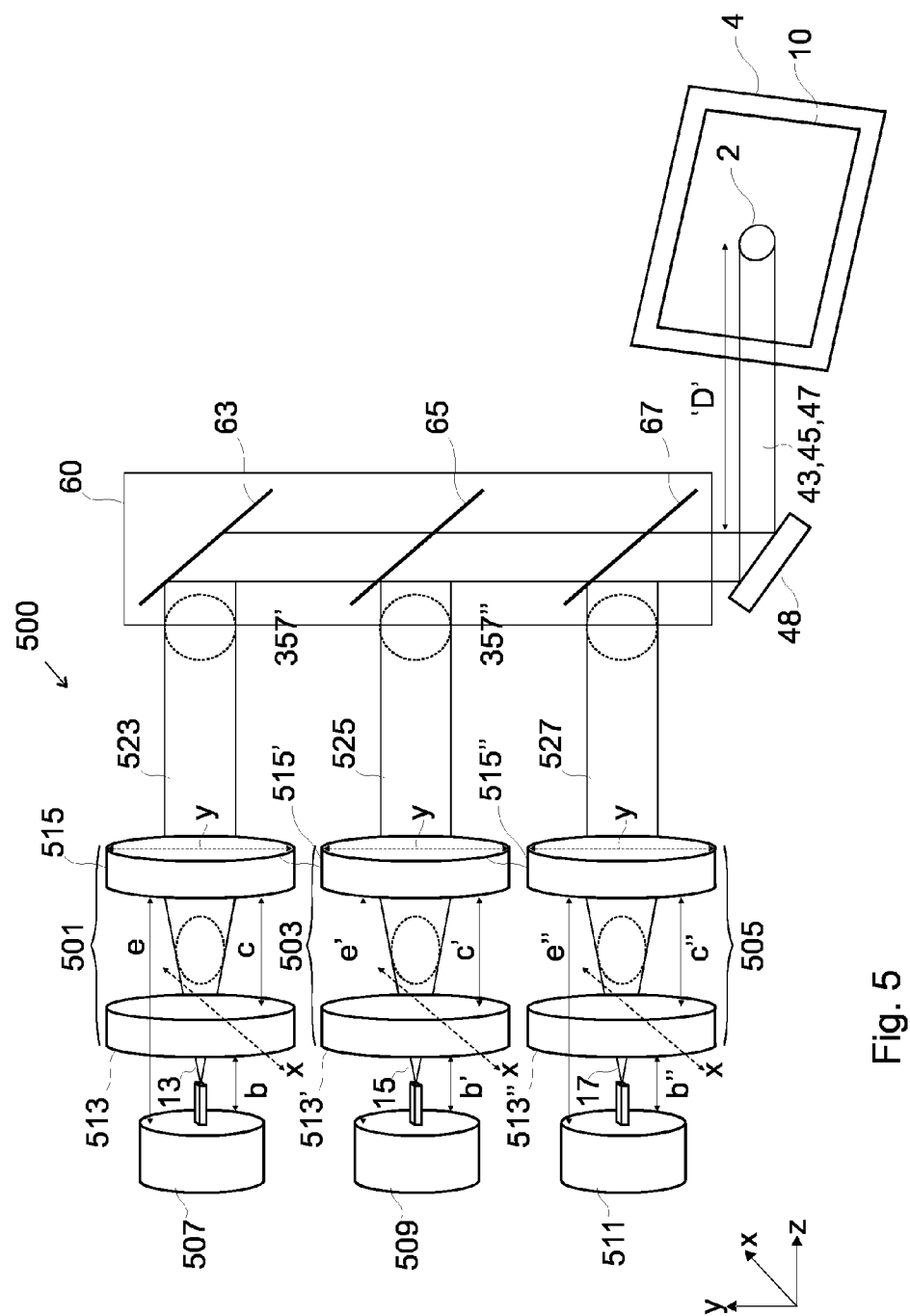
FIG. 5 provides a perspective view of a projection device according to a further embodiment of the present invention.

FIG. 5 provides a perspective view of a projection device 500 according to a further embodiment of the present invention. The projection device 500 is shown to project a pixel 2 onto a display screen 4 which is positioned a predetermined distance 'D' away from the projection device 500. The pixel 2 defines a pixel of an image 10 which is projected onto the display screen 4 by the projection device 500.

The projection device 500 comprises a beam combiner 60 and MEMS mirror 48 similar to those provided in the previous embodiments.

In this embodiment three pairs of lens 501,503,505 collectively define both a means for collimating and an optical modifier means. Each pair of lens 501,503,505 is arranged in optical communication with a respective red, green or blue light source 507,509,511. Lenses 513,515, 513', 515', 513",515" which define each pair 501,503,505 are arranged in optical communication with each other.

A first lens 513,513',513" of each pair 501,503,505 is configured to collimate light along a first axis and a second lens 515,515',515" of each pair 501,503,505 is configured to collimate light along a second axis which is perpendicular to the first axis, to provide red, green and blue projection beams 523,525,527 each of which has a circular cross section. In this example the first lens 513,513',513" of each pair 501, 503,505, is configured to collimate light along a horizontal x-axis and the second lens 515,515',515" of each pair 501,503,505 is configured to collimate light along a vertical y-axis. The first and second lenses 513,515, 513', 515', 513",515" of each pair 501,503,505 may each be aspheric cylindrical lenses. The red, green and blue projection beams 523,525,527 are focused on the display screen 4 to collectively define the pixel 2.

The property of the first lens 513,513',513" which enables it to collimate light is the positive focal length of the lens. In order to collimate the light the first lens 513,513',513" should preferably be placed at the focal length distance from the light source. In order to obtain a well collimated beam both the first and second lenses are preferably plano convex aspheric cylindrical lenses. An aspheric lens, also referred to as an asphere, is a rotationally symmetric optic (or cylindrical symmetric) whose radius of curvature varies radially from its center. It improves image quality, reduces the number of required elements, and lowers costs in optical designs. Collimating along two perpendicular axis, e.g. along the horizontal x-axis and vertical y-axis, will achieve both collimation of the light beams and also provide the light beams with a circular cross section. The property of the lens which enables it to collimate the light is the spheric or aspheric shape of one or both sides of the lens.

The first 513,513',513" collimation lens in the lens pair 501,503,505 should be configured to have a shorter focal length than the second collimation lens 515, 515', 515" of the lens pair 501,503,505 so that the lens pair can convert the oval cross section of light beams 13,15,17 which are emitted from the light sources 507,509,511, to a circular cross section. For example, if the red light 13 emitted from the red light source 507 is emitted with an oval cross section, having a larger divergence angle along the horizontal x-axis compared to the divergence angle along the vertical y-axis, then the lens 513 which collimates along the x-axis should be configured to have a shorter focal lengths, and therefore shorter light source to lens distance, than the lens 515 which collimates along the y-axis. The collimation lens 513 is placed at a distance from the light source 507 which correspond to the lens 513 focal length and therefore the lens 513 collimate the emitted light beam 13 to a cross section diameter along the x-axis equal to [(2*collimation lens 513 focal length)*sin(0.85*x-axis divergence angle)]. The collimation lens 515 is placed at a distance from the light source 507 which correspond to the lens 515 focal length and therefore the lens 515 collimate the emitted light beam 13 to a cross section diameter along the y-axis equal to [(2*collimation lens 515 focal length)*sin(0.85*y-axis divergence angle)]. The two lenses 513 and 515 focal lengths and therefore their lens to light source 507 have to be selected such that the cross section diameters of the collimated light beams in the x-axis and y-axis are equal. As a result the oval cross sectioned red light beam 13, emitted from the red light source 507, will be collimated first to the x-axis and secondly along the y-axis so that the diameter of the oval light beam, along its x-axis, is equal to the diameter along its y-axis, to provide a circular cross sectioned projection beam 523. The lenses 513,513',513", 515,515',515" of each pair 501,503,505 should collimate light along each axis so that the projection light beams 523,525,527 which is emitted from each lens pair 501,503,505 is of a circular cross section. The feature which dictates the beam spot size is the focal lengths of the collimation lens and the distance between the light sources and collimation lens. The distance between the two collimation lenses is usually equal to the difference between their focal lengths. The two collimation lenses focal lengths depend from the light source divergence angles as explain previously.

The distances c,c',c" between the first lens 513,513',513" and second lens 515,515',515" of each pair 501,503,505, and the distances b,b',b", e,e',e" between each light source 507, 509,511, and the first and second lenses 513,515, 513', 515', 513",515" of each lens pair 501,503,505 are such that the dimensions of the circular cross sections of the red, green and blue projection beams 523,525,527 are equal at the predetermined distance 'D' from the projection device 500. As a result the spot size of each of the red, green and blue projection beams 523,525,527 is equal at the predetermined distance 'D' from the projection device 500. This will ensure that the pixel 2 projected onto a display screen 4 which is positioned at a distance 'D' from the projection device 500, will have a circular cross section. Thus, by choosing lenses with the appropriate optical characteristics for each lens pair (e.g. focal length), and by setting the appropriate distances c,c',c" between the lenses of each pair and the appropriate distance between each light source and each of the lenses of a lens pair b,b',b", e,e',e", and by setting the projection device 500 at the predetermined distance 'D' from the display screen 4, a circular pixel can be projected on the display screen 4 by the projection device 500.

The lenses 513,515, 513', 515', 513",515" comprised in all of the pairs 501,503,505, may define a first, second, third, fourth, fifth, and sixth light collimators. The light beams which are transmitted from the first lens 513,513',513" to the second lens 515,515',515" of each pair 501,503,505 may be referred to as an intermediate light beam.

Figure 6:
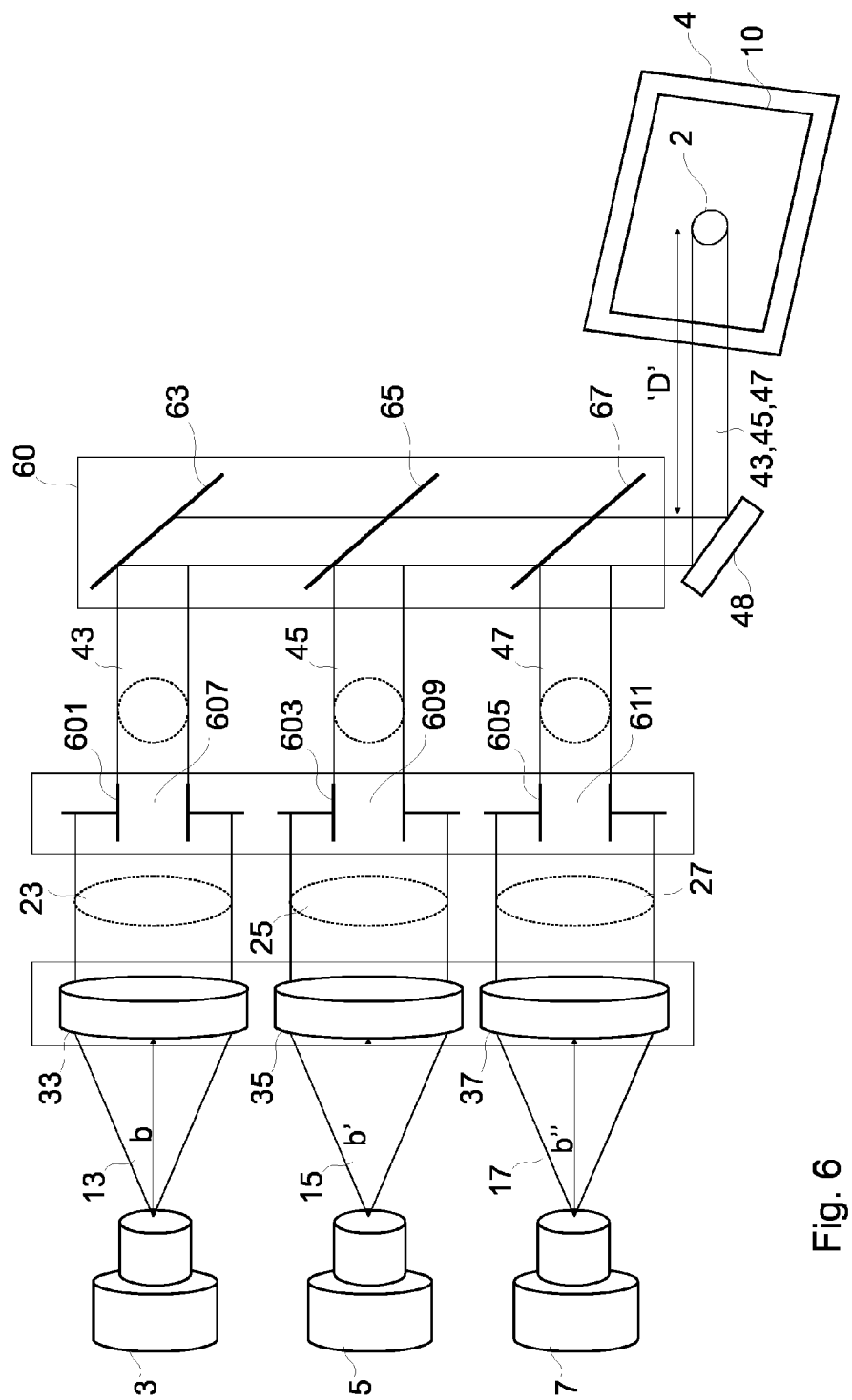
FIG. 6 provides a perspective view of a projection device according to a further embodiment of the present invention.

FIG. 6 provides a perspective view of a projection device 600 according to a further embodiment of the present invention. The projection device 600 has many of the same features shown in the projection device 300 shown in FIG. 3 and like features are awarded the same reference numerals.

The projection device 600 comprises a beam combiner 60 and MEMS mirror 48 similar to those provided in the previous embodiments.

In the projection device 600 the optical modifier means 19 comprises a first, second and third beam restrictor 601,603, 605. The first beam restrictor 601 comprises a first circular pin-hole 607 through which a portion of the red collimated light beam 23 can pass to provide a red projection beam 43 with a circular cross section. The second beam restrictor 603 comprises a second circular pin-hole 609 through which a portion of the green collimated light beam 25 can pass to provide a green projection beam 45 with a circular cross section. The third beam restrictor 605 comprises a third circular pin-hole 611 through which a portion of the blue collimated light beam 27 can pass to provide a blue projection beam 47 with a circular cross section.

The distances b,b',b" between the light sources 3,5,7 and each of the three collimating lenses 33,35,37, and the dimensions of first, second and third circular pin-holes 607,609,611 is such that the dimensions of the circular cross sections of the red, green and blue projection beams 43,45, 47 are equal at the predetermined distance 'D' from the projection device 600. Thus the spot size of each of the red, green and blue projection beams 43,45,47 will be equal at the predetermined distance 'D' from the projection device, and a circular pixel 2 can be projected by the projection device 600 on the display screen 4, which is positioned at the predetermined distance 'D' from the projection device 600.

Advantageously, the embodiment shown in FIG. 6 is cheap and easy to implement as fewer lenses are required.

Figure 7:
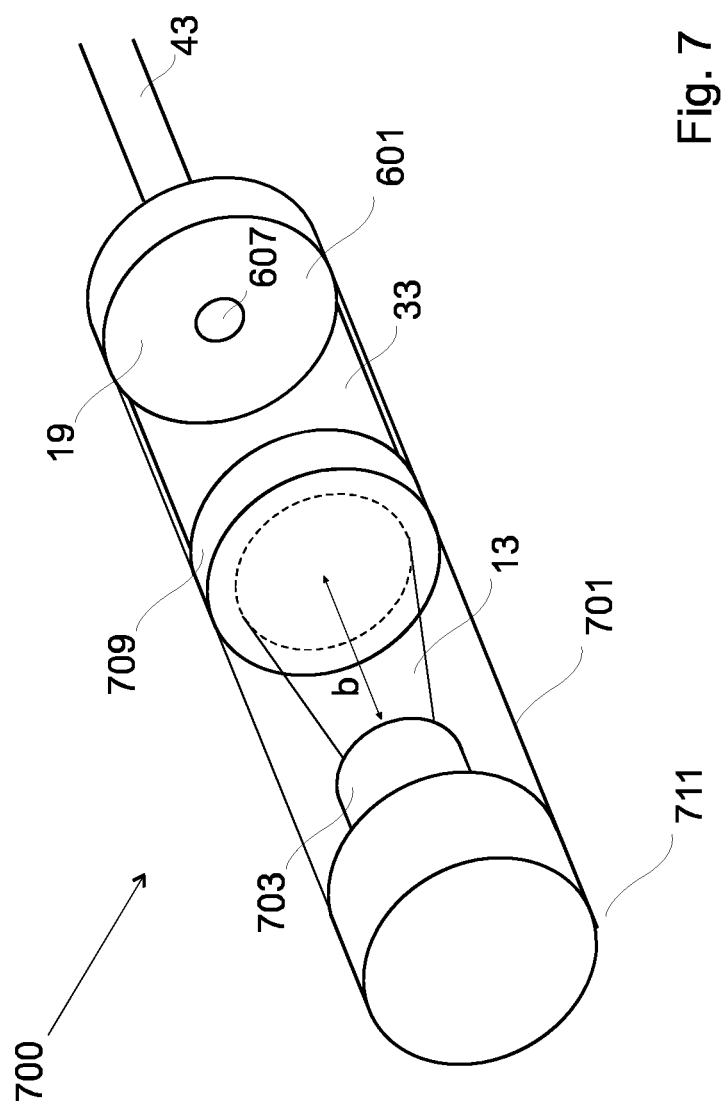
FIG. 7 provides a perspective view of a module for a projection device according to a further aspect of the present invention.

FIG. 7 provides a perspective view of a module 700 for a projection device according to a further aspect of the present invention. The module 700 comprises, a housing 701; a red, green or blue light source 703, fixed within the housing 701. A means for collimating in the form of a collimating lens 709, is fixed with the housing 701 and arranged such that it is in optical communication with the light source 703. The collimating lens 709 is positioned a predetermined distance 'b' from the light source 703 so as to ensure that a spot size of predefined dimensions can be obtained at a predefined distance from the module 700. The module 700 is effectively a stand-alone component. Typically a projection device (not shown) will be configured to have at least three slots, each of which can receive a module 700. Positioning the tubular module 700 in slots of the projection device improves heat dissipation from the module 700. Alternatively, the housing 701 may further comprise a connecting means (not shown) which enables the module 700 to be operably connected within a projection device (not shown).

The module 700 may further comprise an optical modifier means 19 arranged within the housing 701 such that it can optically communicate with the collimating lens 709. The optical modifier means 19 in this example is a beam restrictor 601 with a pin-hole defined therein 607. It will be understood that the optical modifier means 19 could take any suitable form, for example it could take the form of the optical modifier means 19 shown used in embodiments shown in FIGS. 1-5. The optical modifier means 19 is configured such that it can modify the cross sectional dimensions of a collimated light beam 33 which is emitted from the collimating lens 709, to provide a projection beam 43 which has a circular cross section. The optical modifier means 19 may be configured, and the distance 'b' between the light source 703 and the collimating lens 709 may be, such that the projection beam 43 will have predetermined cross sectional dimensions at a predetermined distance from the module 700.

It will be understood that the module 700 may further comprise a deflector element 63,65,67 which defines part of a beam combiner 60.

Figure 8:
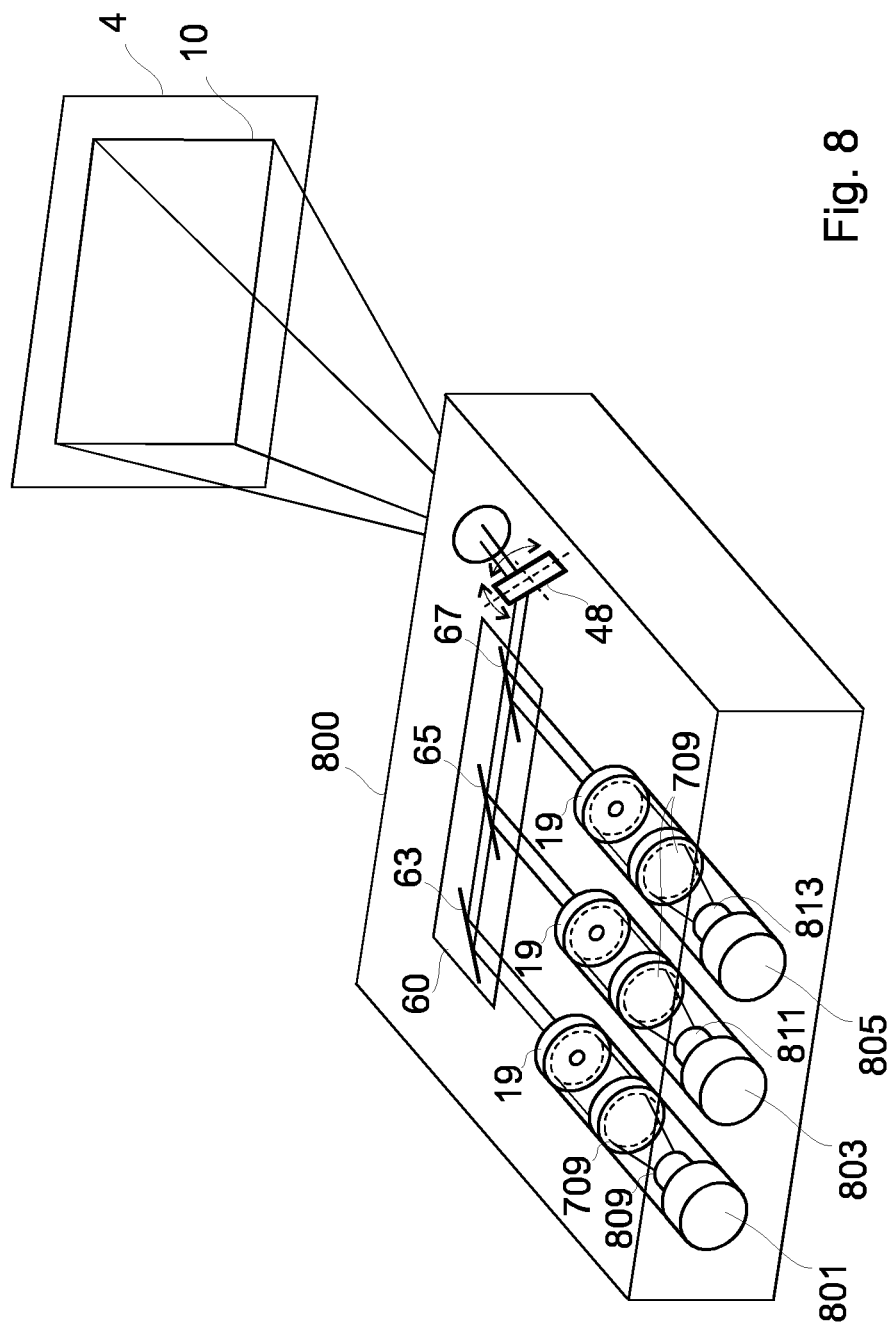
FIG. 8 provides a perspective view of a projection device according to a further aspect of the present invention.

FIG. 8 provides a perspective view of a projection device 800 according to a further aspect of the present invention. The projection device 800 comprises a first second and third modules 801,803,805, each of which are identical to the module 700 shown in FIG. 7. The first module 801 comprises a red light source 809, the second module 803 comprises a green light source 811 and the third module 805 comprises a blue light source 813.

The projection device 800 further comprises a beam combiner 60 as provided in the previous embodiments described above. The beam combiner 60 comprises three deflectors mirrors 63,65,67 each in optical communication with a respective module 801, 803 and 805. The beam combiner 60 combines the projection beams emitted from each module 801, 803 and 805 and deflects the combined projections beams to a MEMS mirror 48.

The MEMS mirror 48 is configured to oscillate about two orthogonal oscillation axes so that oscillation of the MEMS mirror 48 about these oscillation aces scans the projection beams horizontally and vertically across the display screen 4 to display an image 10 on the display screen 4.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. An apparatus to project light, comprising:
    a beam combiner to combine a red, a green and a blue light beam;
    a collimator to collimate the red, the green and the blue light beams;
    a micro electrical mechanical system (MEMS) mirror arranged to oscillate about at least one oscillation axis to receive the collimated red, the collimated green and the collimated blue light beams and to scan the collimated red, the collimated green and the collimated blue light beams across a projection surface; and
    an optical modifier disposed downstream from the MEMS mirror, the optical modifier comprising at least one pair of optical elements and a beam restrictor, the at least one pair of optical elements and the beam restrictor to modify a cross sectional dimension of the collimated red, the collimated green and the collimated blue light beams.

2. The apparatus of claim 1, the at least one pair of optical elements spaced apart a first distance such that the modified cross sectional dimensions of the collimated red, the collimated green and the collimated blue light beams are substantially equal at a second distance away from the MEMS mirror.

3. The apparatus of claim 2, wherein the projection surface is positioned a distance away from the MEMS mirror substantially equal to the second distance.

4. The apparatus of claim 1, comprising the beam combiner disposed between the optical modifier and the MEMS mirror.

5. The apparatus of claim 4, the optical modifier comprising:
    a first pair of lenses arranged to modify the cross sectional dimension of the collimated red light beam;

a second pair of lenses arranged to modify the cross sectional dimension of the collimated green light beam; and a third pair of lenses arranged to modify the cross sectional dimension of the collimated blue light beam.

6. The apparatus of claim 1, comprising the beam combiner disposed downstream from the optical modifier.

7. The apparatus of claim 6, the at least one pair of optical elements comprising a first and a second lens.

8. The apparatus of claim 7, the first lens to expand an incident light beam along a first axis and the second lens to collimate the incident light beam along the same axis.

9. The apparatus of claim 1, comprising an optical element disposed between the collimator and the optical modifier to direct the collimated red, the collimated green and the collimated blue light beams to the optical modifier.

10. The apparatus of claim 9, the optical element comprising a prism.

11. The apparatus of claim 1, the collimator comprising at least one aspheric lens.

12. The apparatus of claim 1, the pair of optical elements comprising cylindrical lenses, each of the cylindrical lenses having a spheric or an aspheric shape.

13. The apparatus of claim 1, the beam restrictor comprising:
a first beam restrictor comprising a first circular pin-hole to transmit a portion of the red collimated light beam;
a second beam restrictor comprising a first circular pin-hole to transmit a portion of the green collimated light beam; and
a third beam restrictor comprising a first circular pin-hole to transmit a portion of the blue collimated light beam.

14. The apparatus of claim 1, comprising a light source to emit the red, the green and the blue light beam.

15. An apparatus to project light comprising:
a first pair of lenses to receive a red light beam, a first lens of the first pair of lenses to collimate the red light beam along a first axis and a second lens of the first pair of lenses to collimate the red light beam along a second axis perpendicular to the first axis to modify a cross sectional dimension of the red light beam;
a second pair of lenses to receive a green light beam, a first lens of the second pair of lenses to collimate the green light beam along a first axis and a second lens of the second pair of lenses to collimate the green light beam along a second axis perpendicular to the first axis to modify a cross sectional dimension of the green light beam;
a third pair of lenses to receive a blue beam, a first lens of the third pair of lenses to collimate the blue light beam along a first axis and a second lens of the third pair of lenses to collimate the blue light beam along a second axis perpendicular to the first axis to modify a cross sectional dimension of the blue light beam;
a beam combiner to combine the collimated red, the collimated green and the collimated blue light beams; and a micro electrical mechanical system (MEMS) mirror arranged to oscillate about at least one oscillation axis to receive the collimated red, the collimated green and the collimated blue light beams and to scan the collimated red, the collimated green and the collimated blue light beams across a projection surface.

16. The apparatus of claim 15, each lens of the first, second and third pair of lenses spaced apart a first distance such that the modified cross sectional dimensions of the collimated red, the collimated green and the collimated blue light beams are substantially equal at a second distance away from the MEMS mirror, wherein the projection surface is positioned a distance away from the MEMS mirror substantially equal to the second distance.

17. The apparatus of claim 15, comprising a light source to emit the red, the green and the blue light beam.

18. A projector comprising:
a red light source to emit a red light beam;
a green light source to emit a green light beam;
a blue light source to emit a blue light beam;
a collimator to collimate the red, the green and the blue light beams;
a micro electrical mechanical system (MEMS) mirror arranged to oscillate about at least one oscillation axis to receive the collimated red, the collimated green and the collimated blue light beams and to scan the collimated red, the collimated green and the collimated blue light beams across a projection surface; and
an optical modifier disposed downstream from the MEMS mirror, the optical modifier comprising at least one pair of optical elements and a beam restrictor, the at least one pair of optical elements and the beam restrictor to modify a cross sectional dimension of the collimated red, the collimated green and the collimated blue light beams.

19. The projector of claim 18, the optical modifier comprising:
a first pair of lenses arranged to modify the cross sectional dimension of the collimated red light beam;
a second pair of lenses arranged to modify the cross sectional dimension of the collimated green light beam; and
a third pair of lenses arranged to modify the cross sectional dimension of the collimated blue light beam.

20. The projector of claim 18, the optical modifier comprising:
a first beam restrictor comprising a first circular pin-hole to transmit a portion of the red collimated light beam;
a second beam restrictor comprising a first circular pin-hole to transmit a portion of the green collimated light beam; and
a third beam restrictor comprising a first circular pin-hole to transmit a portion of the blue collimated light beam.

* * * * *